United States Patent [19]

Brown

[11] 4,066,496
[45] Jan. 3, 1978

[54] CRYOGENIC EXPANSION JOINT FOR LARGE SUPERCONDUCTING MAGNET STRUCTURES

[75] Inventor: Robert L. Brown, Kingston, Tenn.

[73] Assignee: The United States of America as represented by the United States Energy Research and Development Administration, Washington, D.C.

[21] Appl. No.: 699,394

[22] Filed: June 24, 1976

Related U.S. Application Data

[63] Continuation-in-part of Ser. No. 504,932, Sept. 11, 1974, abandoned.

[51] Int. Cl.² ............................ G21B 1/00; H01J 7/24
[52] U.S. Cl. ..................... 176/3; 315/111.4; 174/12 R
[58] Field of Search ........................ 176/1–9; 174/12 R, 15 CA; 335/216; 336/DIG. 1; 220/9 LG, 232; 248/1, 54 CS, DIG. 1; 403/5, 28, 32, 41; 136/211, 212; 315/111.4

[56] References Cited

U.S. PATENT DOCUMENTS 3,607,444  9/1971  DeBucs .................... 136/212

OTHER PUBLICATIONS

ORNL-TM 3096, pp. 1–77.
ORNL-TM 4342 pp. 1–22.
Proceedings of 5th Symposium on Engineering Problems of Fusion, 10/5–9/73, pp. 545–547.
UWFDM-112 (8/75) pp. III-A-20 – III-A-25.

Primary Examiner—Verlin R. Pendegrass
Assistant Examiner—S. A. Cangialosi
Attorney, Agent, or Firm—Dean E. Carlson; Stephen D. Hamel; Louis M. Deckelmann

[57] ABSTRACT

An expansion joint is provided that accommodates dimensional changes occurring during the cooldown and warm-up of large cryogenic devices such as superconducting magnet coils. Flattened tubes containing a refrigerant such as gaseous nitrogen ($N_2$) are inserted into expansion spaces in the structure. The gaseous $N_2$ is circulated under pressure and aids in the cooldown process while providing its primary function of accommodating differential thermal contraction and expansion in the structure. After lower temperatures are reached and the greater part of the contraction has occured, the $N_2$ liquefies then solidifies to provide a completely rigid structure at the cryogenic operating temperatures of the device.

2 Claims, 2 Drawing Figures

CRYOGENIC EXPANSION JOINT FOR LARGE SUPERCONDUCTING MAGNET STRUCTURES

BACKGROUND OF THE INVENTION

This invention was made in the course of, or under, a contract with the United States Atomic Energy Commission.

CROSS-REFERENCE TO RELATED APPLICATION

This application is a continuation-in-part of U.S. application Ser. No. 504,932, filed Sept. 11, 1974, now abandoned.

As superconducting magnet coils are made to larger dimensions, the effects of thermal contraction and expansion become more pronounced. Designs are proposed for superconducting magnet coils so large that dimensional changes during cooldown and warm-up are going to have to be accommodated in some positive manner.

According to conventional prior art practice, the usual proposal is to insert plastic pads into fill spaces at the inner and outer perimeter of the magnet coil stacks, that is, where the coil stacks contact the bobbin and the restraining ring. Such expansion joints have undesirable characteristics for systems that reach cryogenic temperatures. They may not fit tightly at all temperatures, may not be able to withstand the temperature change without crumbling, or may not be able to withstand the magnetic and cooldown forces. With such defects, there is no assurance that their use would avoid damage to the superconductors.

Thus, there exists a need for expansion joints for large superconducting magnet coils that are utilized in large devices for producing a hot plasma, and that will overcome the above disadvantages. The present invention was conceived to meet this need in a manner to be described hereinbelow.

SUMMARY OF THE INVENTION

It is the object of the present invention to provide improved expansion joints for use with large superconducting magnet coils, wherein such expansion joints are capable of withstanding many thermal cycles between room and cryogenic temperatures.

The above object has been accomplished in the present invention by providing flattened tubes, containing a refrigerant such as gaseous nitrogen, which are inserted into the expansion spaces at the inner and outer perimeter of the magnet coil stacks of a large superconducting magnet wherein such tubes are positioned between the coil stacks and coil bobbin and between the coil stacks and the magnet containment ring, respectively. The gaseous nitrogen is circulated under pressure and aids in the cooldown process while providing its primary function of accommodating differential thermal contraction and expansion in the structure.

DESCRIPTION OF THE PREFERRED EMBODIMENT

The expansion joints of the present invention were conceived for use with very large superconducting toroidal magnet coils such as utilized in hot plasma producing devices, and in the Oak Ridge National Laboratory ORMAK-R/BX Facility as described in the report: ORNL-TM-4634, dated June 1974.

Figure 1:
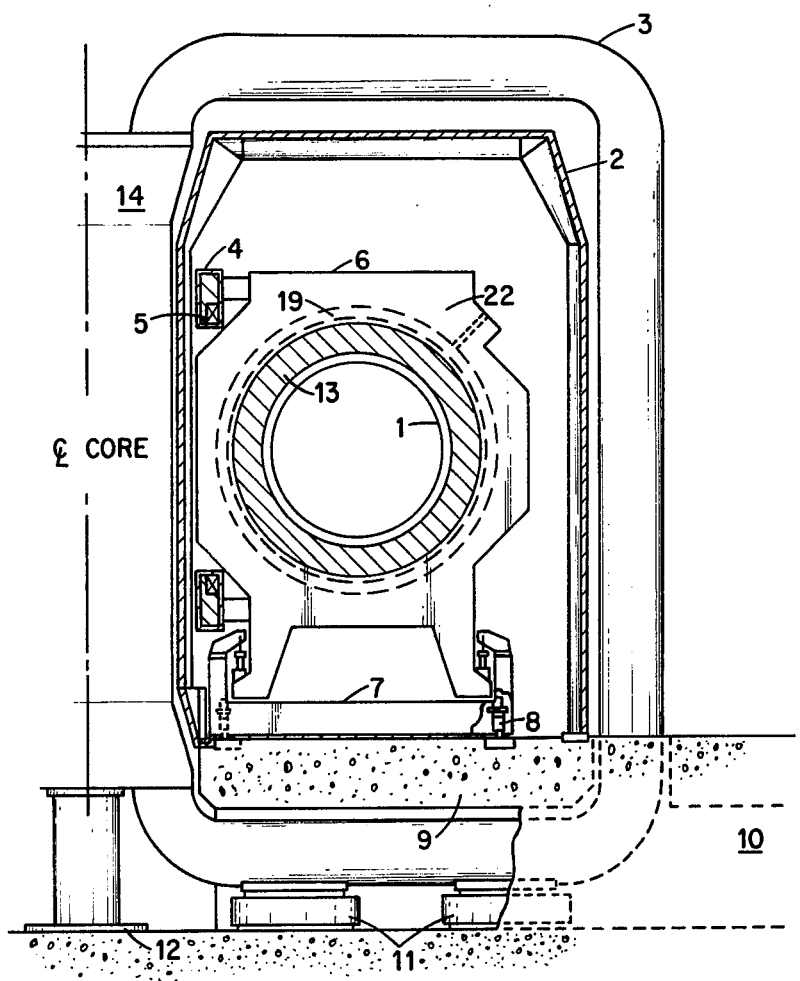
FIG. 1 is a sectional view through one toroidal magnet coil segment of a device for producing a hot plasma.

A section through one toroidal magnet coil segment of a device for producing a hot plasma, such as the ORMAK-F/BX design, is illustrated in FIG. 1 of the drawing. A single toroidal field coil is indicated by the reference numeral 19 and is shown just outside the shield region 13 of the device. A central magnetic core 14 of the device is supported by a pedestal 12, and a plurality of magnetic return legs 3, only one shown in FIG. 1, are supported by a plurality of supports 11. Encompassing the magnet coil segment 19 is a stainless steel restraining ring 22 within a housing 6 which is supported by a base structure 7 and jacks 8 which are in turn supported by a concrete base 9. Bucking rings 4, which may contain ohmic heating coils 5 are provided to restrain the magnetic forces developed in the magnetic coils 19 during operation of the device. A liner 1 is provided which defines the plasma generating volumn within the device, the plasma being confined within the torus liner 1 by the plurality of magnet coils 19 which encompass the liner 1. a secondary vacuum enclosure 2 is provided for enclosing the canned enclosure 6. An access tunnel 10 is provided and this tunnel is utilized for providing the necessary vacuum lines, power supplies, refrigeration lines, etc., for operation of the device. The primary coolant for the toroidal field coils 19 is liquid helium. It should be understood that the ORMAK-F/BX design utilizes 24 toroidal field coils, and the operating characteristics of such coils are set forth in pages D-56 through D-82 of the above-mentioned report ORNL-TM-4634, to which reference is made.

Figure 2:
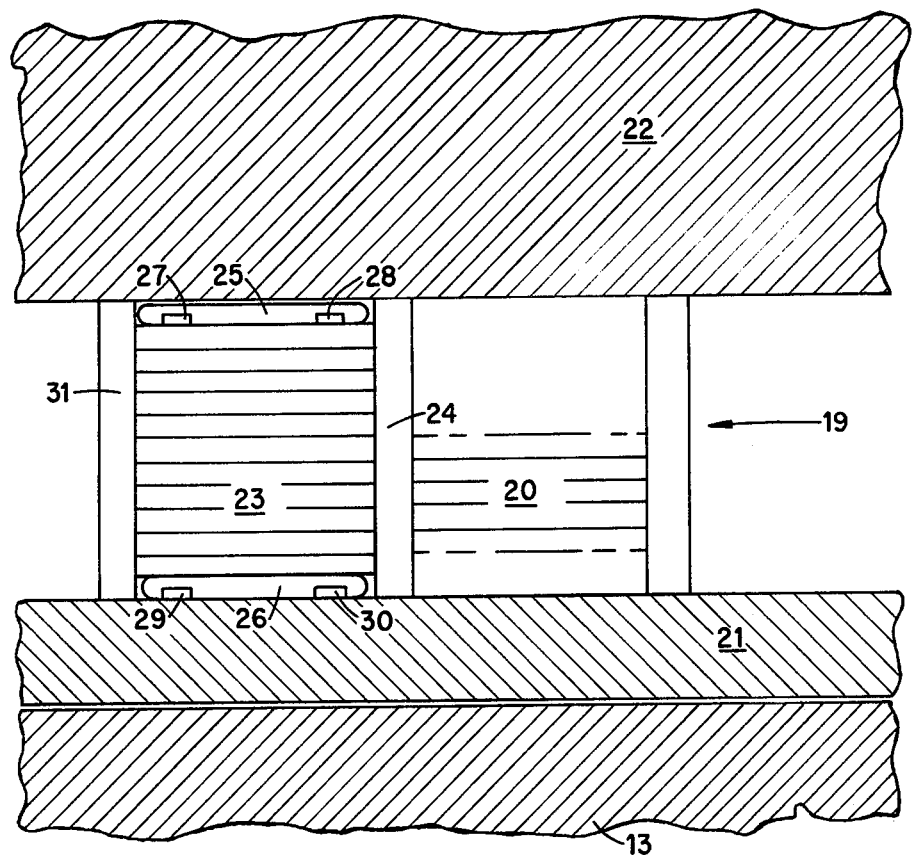
FIG. 2 is a sectional view of a portion of a toroidal magnet coil and the improved expansion joints of the present invention for use in the device of FIG. 1.

The toroidal field coil 19 is shown in more detail in FIG. 2, although not to scale. It is comprised of an inner ring (a coil bobbin) 21 and a massive outer ring (a containment or restraining ring) 22 with stacks of superconducting windings 20, 23, etc., therebetween. When the windings 20, 23 are wound on the 20-foot diameter stainless steel bobbin 21, they will contract about 0.050 inch on the diameter more than the bobbin during cooldown to operating temperature (temperature of liquid helium). This will occur as the copper windings 20, 23 and the stainless steel bobbin 21 and ring 22 undergo an overall contraction of about 0.75inch on the diameter. The superconductors should cool much faster than the bobbin 21 and especially the restraining ring 22, given any reasonable time period. Such differential thermal contraction on cooldown will result in high localized pressures in the toroidal field coil 19. In this connection, it has also been established that when the toroidal field coils are energized following cooldown, the magnetic field will cause the coil windings to exert 2000 psi forces on the coil bobbin 21.

Thus, expansion joints that can function efficiently down to cryogenic temperatures and insure that excessive local contact stresses on the coil windings will be avoided are accordingly required. As mentioned hereinabove and according to conventional practice, the usual proposal is to insert plastic pads into the fill spaces at the inner and outer perimeter of the coil stacks 23, that is, where the coil stacks contact the bobbin 21 and the restraining ring 22. Such expansion joints have undesirable characteristics for systems that reach cryogenic temperatures, as outlined hereinabove, such that there is no assurance their use would avoid damage to the superconductors.

The cryogenic expansion joints of the present invention overcome these disadvantages and should be capable of withstanding many thermal cycles between room and cryogenic temperatures. In FIG. 2 this flexible structure comprises flattened tubes 25 and 26 shown in cross section which are placed at the inner and outer periphery of each stack of superconducting coils 23, 20, etc. The flattened tubes 25, 26 are constructed of type 304 stainless steel, for example, and contain a refrigerant adapted to be circulated under high pressure and the tubes also have internal spacers 27, 28, and 29, 30, respectively, that prevent irremeable flattening of the tubes and insure an unconstricted circulation path for the refrigerant. The tubes are expanded greater than the spacer thickness before the conductors are wound on them. This is accomplished by winding the superconductor on a dummy strip that is of the proper thickness and then replacing the dummy strip with the flattened expanded tube to thus provide accommodation for taking up the contraction forces. Coils are wound on a vertical axis machine so that gravity will not present a problem with the insertion of tubes.

It should be noted that the superconductor is designed such that the strength thereof is about 10 times stronger than the operating forces. Furthermore, operating forces are not applied until after the refrigerant has frozen solid and in itself will be very strong. Even if it wasn't strong it would hold because it would require displacement of the refrigerant which has no escape route.

It is not necessary for the flexible structure to be a flattened tube. For related applications it could be a bellows, cylinder and piston, or any structure able to exhibit flexibility at lower temperatures and designed to relieve excessive local stresses by absorbing large forces of contraction and expansion. The main requirement of the refrigerant circulated in the tubes is that it have a low melting point. Gaseous nitrogen ($N_2$) is preferred for this purpose because it is inexpensive, plentiful, relatively easy to handle, safe, and required for other purposes anyway. Since it is assumed that the primary coolant will be liquid helium circulated in the spaces 24 and 31 between coil stacks, the $N_2$ circulated in the flattened tubes 25 and 26 under pressure will act as a secondary coolant in the cooldown process.

In more operation, at room temperature the inner tube of a superconductor stack (tube 26) is initially expanded more than the outer tube 25. This is accomplished in the design of the toroidal coil segment itself. During the cooldown process, the superconductor windings 23 will contract faster than the coil bobbin 21, increasing the mechanical pressure on the inside tube 26. Flattening of tube 26 will thus allow for contraction of the conductors 23 without stretching them and the expansion of outside tube 25 will keep the system tight. As the desired temperature is approached, the $N_2$ will first liquefy and finally solidify. Thus, the expansion joints 25 and 26 will have remained flexible during most of the cooldown, but particularly at the higher temperatures where most of the dimensional shifting occurs. Then, as the final temperature is approached, the $N_2$ freezes to form a completely rigid structure that will be mechanically sufficient to support the larger magnetic forces of the coils 23 when they are energized. When the system is to be returned to room temperature, the sequence of events is simply reversed, resulting in the return of the system to its initial condition.

From the above-described invention, it can be seen that the $N_2$ circulated under pressure in the tubes 25 and 26 aids in the cool-down process while providing its primary function of accommodating differential thermal contraction and expansion in the device.

Regarding the effect of the reaction space, it should be understood that although the hot plasma reactions produced in the device generate very high temperatures, there can be no reactions without proper operation of the superconducting coils. These coils are superconducting only at cryongenic temperatures. Therefore, anything built into the coil windings must be maintained at about 4.2° K. While the plasma reactions are underway in the device, there is a radiation flux (x-rays and neutrons) that penetrates the windings. The radiation shield 13 that surrounds the reactions will stop most of this and any heat generated in the windings is negligible, or least small enough that the coils will remain superconducting. It should be noted that nitrogen solidifies at about 62°K so that it will be solid at all operating temperatures of the device.

In connection with the statement above that the expansion joints should be capable of withstanding many themal cycles, an experiment has been conducted on such flattened tubes of stainless steel by Mr. Karl Froelich and reported by him at the Fusion Engineering Conference in San Diego, California, Nov. 18–21, 1975. In that experiment, flattened tubes of stainless steel were sandwiched between two half-cylinders and were pressurized with gaseous helium to create very high forces for tensile and compression test of test specimens at liquid helium temperatures (4.2° K). This experiment has been successfully and repeatedly performed at liquid helium temperatures and at some high pressures (about 1800 psi) in the tubes. It is also a more severe test because helium was used in the tubes which is very easy to leak as opposed to nitrogen.

It should be noted that for typical operating pressures during operation of the device, the press would be less then 500 psi. As pointed out above, pressures in the tubes to 1800 psi have been successfully tested. The bursting pressure requirements are not high because the tubes are restricted on the flat surfaces and the edges do not have large areas exposed.

It should be understood that the device described above will produce a very hot plasma with the consequent production of a copious quantity of neutrons and x-rays, such that the device has utility as a neutron source, or as an x-ray source. It will also have a future utility in devices for producing thermonuclear fusion when such devices are successfully reduced to practice.

This invention has been described by way of illustration rather than by limitation and it should be apparent that it is equally applicable in fields other than those described.

What is claimed is:

1. In a device for producing a very hot plasma and consequent production of neutrons and x-rays, including a central magnetic core, a plurality of magnetic return legs for said core, a torus liner encompassing said core, a toroidal shield encompassing said torus liner, a plurality of spaced-apart, toroidal superconducting field coils encompassing said shield, each of said coils being wound on a respective coil bobbin, a respective massive outer ring encompassing each of said coils, and a pair of bucking rings mounted between the upper and lower portions of said coil outer rings and said magnetic core, the improvement comprising a first respective peripheral expansion joint mounted between each of said coils and each of said coils bobbins, and a second respective peripheral expansion joint mounted between each of said coils and each of said outer rings, each of said expansion joints comprising a flattened tube containing a refrigerant adapted to be circulated under high pressure therethrough, and each of said flattened tubes containing a pair of spacers mounted therewithin for preventing irremeable flattening thereof, whereby during cooldown of said coils and subsequent operation of said device to produce said hot plasma within said liner, said expansion joints functioning to accommodate differential thermal contraction and expansion between said coils and outer ring and between said coils and coil bobbins while at the same time aiding in said cooldown.

2. The device set forth in claim 1, wherein said refrigerant in each of said flattened tubes is nitrogen.

* * * * *